United States Patent
Zhang et al.

(10) Patent No.: US 12,335,507 B2
(45) Date of Patent: Jun. 17, 2025

(54) IMAGE ENCODING DEVICE AND WEIGHTED PREDICTION IMAGE ENCODING METHOD

(71) Applicant: SigmaStar Technology Ltd., Fujian (CN)

(72) Inventors: Shao-Bo Zhang, Shanghai (CN); Cheng-Wei Zheng, Shanghai (CN); Jian-Qiang Du, Shanghai (CN); Zhen-Bao Huang, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 112 days.

(21) Appl. No.: 18/501,363

(22) Filed: Nov. 3, 2023

(65) Prior Publication Data
US 2024/0267551 A1  Aug. 8, 2024

(30) Foreign Application Priority Data
Feb. 7, 2023 (CN) .......................... 202310150817.6

(51) Int. Cl.
*H04N 19/50* (2014.01)
*H04N 19/132* (2014.01)
*H04N 19/136* (2014.01)
*H04N 19/172* (2014.01)

(52) U.S. Cl.
CPC ........... *H04N 19/50* (2014.11); *H04N 19/132* (2014.11); *H04N 19/136* (2014.11); *H04N 19/172* (2014.11)

(58) Field of Classification Search
CPC .... H04N 19/50; H04N 19/132; H04N 19/136; H04N 19/172; H04N 19/105; H04N 19/186
USPC ...................................................... 375/240.08
See application file for complete search history.

(56) References Cited

U.S. PATENT DOCUMENTS

| | | | |
|---|---|---|---|
| 2019/0261001 A1* | 8/2019 | Holland | H04N 19/567 |
| 2021/0392344 A1* | 12/2021 | Bossen | H04N 19/593 |
| 2023/0108110 A1* | 4/2023 | Nishi | H04N 19/31 |
| | | | 375/240.02 |
| 2023/0179774 A1* | 6/2023 | Li | H04N 19/105 |
| | | | 375/240.02 |

* cited by examiner

*Primary Examiner* — Marnie A Matt
(74) *Attorney, Agent, or Firm* — Edell, Shapiro & Finnan, LLC (57) ABSTRACT

A weighted prediction image encoding method includes: calculating a first feature value of a first frame, a second feature value of a second frame and a third feature value of a third frame; calculating a first offset value according to the first feature value and the second feature value, and calculating a second offset value according to the second feature value and the third feature value; and when both of the first offset value and the second offset value are greater than or less than a predetermined value, encoding the third frame by utilizing weighted prediction operation, wherein the first frame, the second frame and the third frame are multiple frames in chronological order.

13 Claims, 4 Drawing Sheets

IMAGE ENCODING DEVICE AND WEIGHTED PREDICTION IMAGE ENCODING METHOD

This application claims the benefit of China application Serial No. CN202310150817.6, filed on Feb. 7, 2023, the subject matter of which is incorporated herein by reference.

BACKGROUND OF THE INVENTION

Field of the Invention

The present application relates to an image encoding device, and more particularly to an image encoding device and a weighted prediction image encoding method that determine by a simple calculation whether to activate weighted prediction operation.

Description of the Related Art

Weighted prediction operation can be used to process multiple images of which luminance continually increases or decreases in a scenario of a video. In a current image encoding technique, all pixels of a current frame and each reference frame need to be traversed multiple times to generate certain parameters for decision making. These parameters are used to correct frames to thereby determine whether to utilize weighted prediction operation to encode the current frame. Thus, the overall computation amount may become overly large, and data (for example, the parameters above) dependency (or coupling) is also resulted during the computation, such that the image coding technique cannot be easily implemented by pipelined hardware.

SUMMARY OF THE INVENTION

In some embodiments, it is an object of the present application to provide an image encoding device and a weighted prediction image encoding method that determine by a simple calculation whether to activate weighted prediction operation, so as to improve the issues of the prior art.

In some embodiments, a weighted prediction image encoding method includes: calculating a first feature value of a first frame, a second feature value of a second frame and a third feature value of a third frame; calculating a first offset value according to the first feature value and the second feature value, and calculating a second offset value according to the second feature value and the third feature value; and when both of the first offset value and the second offset value are greater than or less than a predetermined value, encoding the third frame by utilizing weighted prediction operation, wherein the first frame, the second frame and the third frame are multiple frames in chronological order.

In some embodiments, the image encoding device includes a preprocessing circuit and a weighted prediction circuit. The preprocessing circuit calculates a first feature value of a first frame, a second feature value of a second frame and a third feature value of a third frame. The weighted prediction circuit calculates a first offset value according to the first feature value and the second feature value, calculates a second offset value according to the second feature value and the third feature value, and when both of the first offset value and the second offset value are greater than or less than a predetermined value, controls an encoding circuit to encode the third frame by utilizing weighted prediction operation, wherein the first frame, the second frame and the third frame are multiple frames in chronological order.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
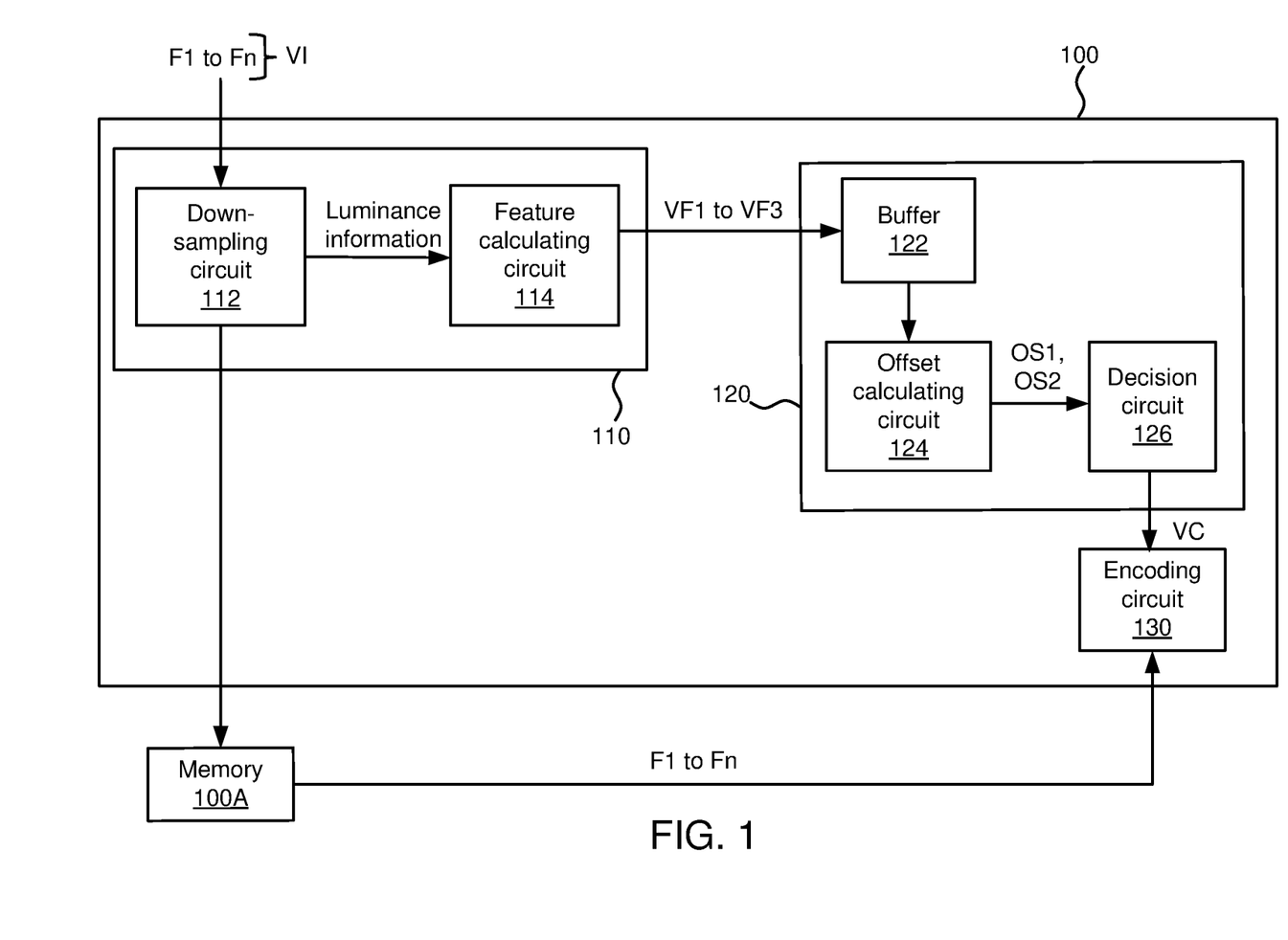
FIG. 1 is a schematic diagram of an image encoding device according to some embodiments of the present application.

FIG. 1 shows a schematic diagram of an image encoding device 100 according to some embodiments of the present application. In some embodiments, the image encoding device 100 may determine according to a change in multiple consecutive images to be encoded in a video whether to activate weighted prediction operation, wherein an algorithm of the weighted prediction operation can be referred from details of calculation methods in related art. The following description focuses on how to determine whether to activate the weighted prediction operation.

The image encoding device 100 includes a preprocessing circuit 110, a weighted prediction circuit 120 and an encoding circuit 130. The preprocessing 110 can sequentially process luminance values of pixels in multiple frames F1 to Fn in a video VI so as to obtain luminance information corresponding to each of the frames. For example, the multiple frames F1 to Fn are multiple frames in chronological order. In other words, if the frame F1 is a first frame, the frame F2 may be a second frame appearing after the frame F1, and the frame F3 may be a third frame appearing after the frame F2. Similarly, the order relation of these frames F1 to Fn in time can be understood. The preprocessing 110 can sequentially process the luminance values of the pixels in the multiple frames F1 to Fn so as to obtain multiple sets of luminance information corresponding to the multiple frames F1 to Fn. For example, the preprocessing circuit 110 can process the luminance values of pixels in the frame F1 to obtain first luminance information of the frame F1, process the luminance values of pixels in the frame F2 to obtain second luminance information of the frame F2, and process the luminance values of pixels in the frame F3 to obtain third luminance information of the frame F3. Similarly, related operations of the preprocessing circuit 110 can be understood accordingly. The preprocessing circuit 110 can transfer the multiple frames F1 to Fn to a memory 100A, for the encoding circuit 130 to read the multiple frames F1 to Fn from the memory 100A for encoding. In some embodiments, the memory 100A may be, for example but not limited to, a dynamic random access memory (DRAM).

The preprocessing circuit 110 can generate a feature value corresponding to a predetermined frame according to the luminance information above. A down-sampling circuit 112 can down-sample a corresponding frame in the multiple frames F1 to Fn to obtain a down-sampled frame of the corresponding frame, and obtain luminance values of pixels in the down-sampled frame as the luminance information of the corresponding frame. For example, the preprocessing circuit 110 may include a down-sampling circuit 112 and a feature calculating circuit 114. The down-sampling circuit 112 can down-sample a corresponding frame in the multiple frames F1 to Fn to obtain a down-sampled frame of the corresponding frame, and obtain luminance values of at least a part of pixels in down-sampled frame as the luminance information of the corresponding frame. For example, the down-sampling circuit 112 can reduce the resolution of the frame F1 to obtain a down-sampled frame of the frame F1, and obtain luminance values of all pixels from the down-sampled frame to thereby determine first luminance information of the frame F1. In other words, the number of pixels of the down-sampled frame is less than the number of all pixels in the frame F1. For example, the down-sampling circuit 112 can down-sample the frame F1 by a quarter in the horizontal direction and the vertical direction (that is, one pixel in the down-sampled frame corresponds to four pixels in the frame F1) to generate the down-sampled frame of the frame F1, and obtain luminance values of all pixels in the down-sampled frame, wherein the luminance value of each pixel in the down-sampled frame may be, for example but not limited to, an average value of the luminance values of the four corresponding pixels in the frame F1. Similarly, the down-sampling circuit 112 can obtain second luminance information corresponding to the frame F2 and third luminance information corresponding to the frame F3. It should be noted that the above numerical value for the rate of down-sampling is merely an example, and the present application is not limited to such example.

The feature calculating circuit 114 can generate the feature value corresponding to the predetermined frame according to the luminance values of at least a part of the pixels in the down-sampled frame corresponding to the predetermined frame. In some embodiments, the feature calculating circuit 114 can perform a statistical calculation according to the luminance information of the down-sampled frame (for example, the luminance values of at least a part of pixels in the down-sampled frame) to generate a feature value of the corresponding frame. For example, the feature calculating circuit 114 can determine the luminance information of the down-sampled frame according to the luminance values of at least a part of pixels in the down-sampled frame, and accordingly perform a statistical calculation to determine the feature value of the corresponding frame.

More specifically, in an example, the feature calculating circuit 114 can calculate an average luminance value (for example, by dividing a total of the luminance values of all of the pixels by the number of pixels to determine the average luminance value) of all pixels (or at least a part of pixels) in the down-sampled frame corresponding to the frame F1 to generate the feature value (denoted as VF1) of the frame F1. Similarly, the feature calculating circuit 114 can calculate an average luminance value of all pixels (or at least a part of pixels) in the down-sampled frame corresponding to the frame F2 to generate the feature value (denoted as VF2) of the frame F2. Similarly, the feature calculating circuit 114 can generate the feature value (denoted as VF3) of the frame F3. It should be noted that the average means above is an example of the statistical calculation for generating the feature values, and the present application is not limited to such example. In a different embodiment, various statistical calculations for processing luminance information to generate a luminance change sufficient to identify frames can be used to generate the feature value corresponding to the predetermined frame. In some embodiment, the feature calculating circuit 114 may be implemented by, for example but not limited to, a digital logic circuit that can implement the calculation above.

The weighted prediction circuit 120 can determine multiple offset values OS1 and OS2 according to the multiple feature values VF1 to VF3, and determine according to the offset values corresponding to multiple consecutive frames whether to control the encoding circuit 130 to use weighted prediction operation to encode the current frame. For example, the weighted prediction circuit 120 can determine the offset OS1 according to a difference between the feature value VF1 and the feature value VF2, and determine the offset value OS2 according to a difference between the feature value VF2 and the feature value VF3, wherein the offset value OS1 can be represented as VF2-VF1, and the offset value OS2 can be represented as VF3-VF2. The weighted prediction circuit 120 can determine, according to comparison results between the offset value OS1 and a predetermined value (for example but not limited to, 0) and between the offset value OS2 and the predetermined value, whether to activate weighted prediction operation.

For example, if both of the offset value OS1 and the offset value OS2 are greater than or less than the predetermined value, it means that the luminance of the image content corresponding to the frame F1, the frame F2 and the frame F3 increases continuously or decreases continuously. In this case, the weighted prediction circuit 120 can control the encoding circuit 130 to activate the weighted prediction operation to encode the current frame (for example, the frame F3). Thus, a frame of a scenario with a gradual luminance change can be provided with more efficient encoding. Alternatively, if not both of the offset value OS1 and the offset value OS2 are greater than or less than the predetermined value, it means that there is no change (for example, the multiple offset value OS1 and OS2 are equal to the predetermined value) or there is no obvious increase or decrease (for example, the offset value OS1 is greater than the predetermined value and the offset value OS2 is less than the predetermined value) in the luminance of the image content corresponding to the frame F1, the frame F2 and the frame F3. In this case, the weighted prediction circuit 120 can control the encoding circuit 130 not to activate the weighted prediction operation but to use a common encoding means to encode the current frame (for example, the frame F3).

More specifically, the weighted prediction circuit 120 includes a buffer 122, an offset calculating circuit 124 and a decision circuit 126. The buffer 122 can be used to store the multiple feature values VS1 to VF3 and the multiple offset values OS1 and OS2. The offset calculating circuit 124 can read the multiple feature values VF1 to VF3 from the buffer 122, perform the difference calculation above to obtain the multiple offset values OS1 and OS2, and store the multiple offset values OS1 and OS2 to the buffer 122. The decision circuit 126 can compare each of the offset value OS1 and the offset value OS2 with the predetermined value to determine whether to issue a control signal VS to control the encoding circuit 130 to utilize the weighted prediction operation to encode the current frame. In some embodiment, each of the offset calculating circuit 124 and the decision circuit 126 can be implemented by, for example but not limited to, a digital logic circuit that can carry out the calculation above.

The encoding circuit 130 can determine according to the control signal VS whether to utilize the weighted prediction operation to encode the frames read from the memory 100A. For example, if the encoding signal VC has a predetermined logical value, the encoding circuit 130 can utilize weighted prediction operation to encode the frame currently read. Alternatively, if the encoding signal VC does not have the predetermined logical value, the encoding circuit 130 can utilize an original image encoding algorithm to encode the frame currently read. In some embodiments, the weighted prediction operation is an algorithm that encodes a frame by using parameters such as a reference frame (for example, a previous frame), a prediction weight and an offset value, wherein the offset value may be the offset value OS1 and the offset value OS2, and the weight may be a preset value (for example but not limited to 64). In some embodiments, the value of the weight can be configured with consideration of implementation complexities of a digital circuit. For example, the value of the weight can be set to be a power of 2, for the digital circuit to better perform the weighted prediction operation by using a simple method such as a shift operation.

Figure 2:
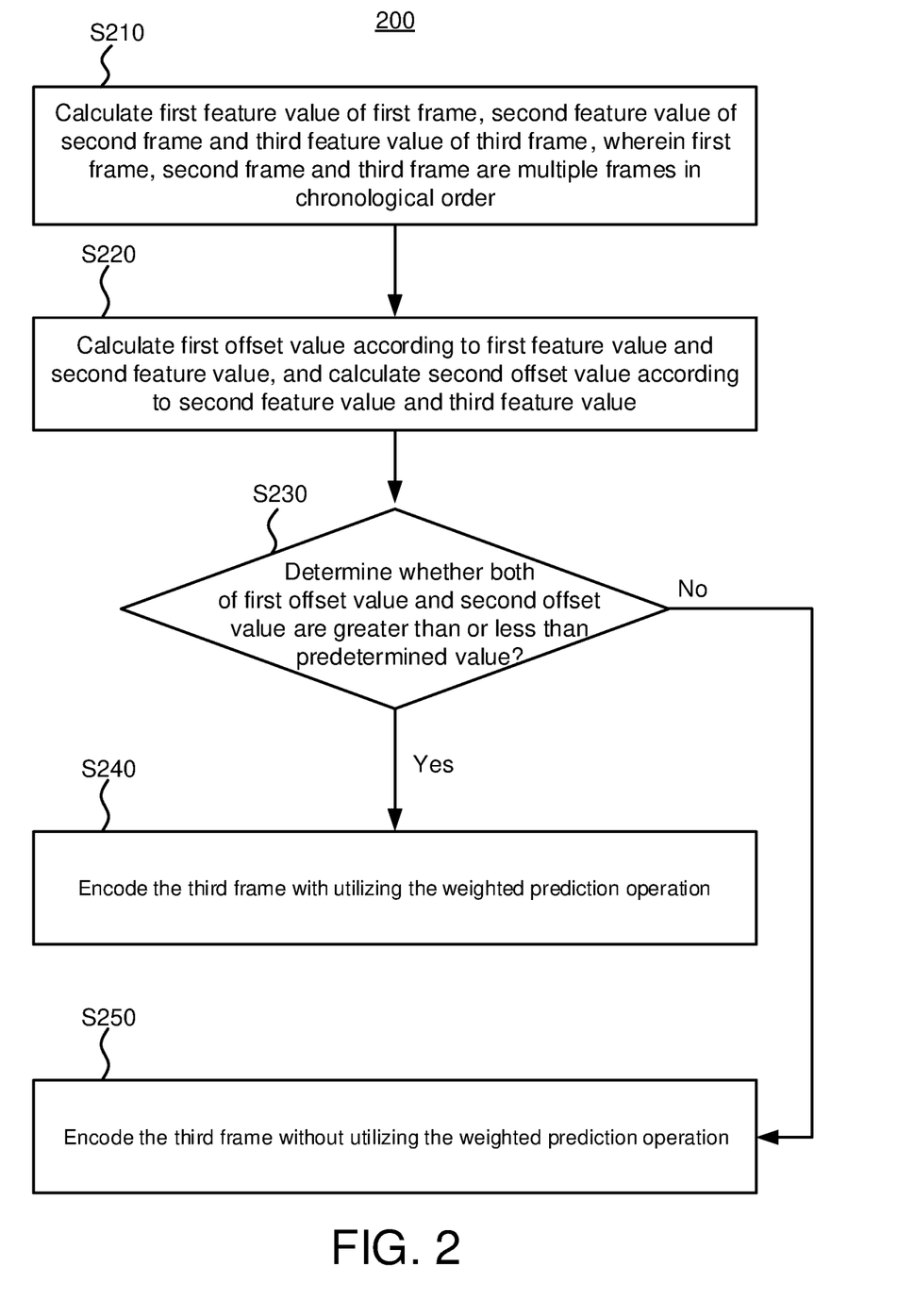
FIG. 2 is a flowchart of a weighted prediction image encoding method according to some embodiments of the present application.

FIG. 2 shows a flowchart of a weighted prediction image encoding method 200 according to some embodiments of the present application. In some embodiments, the weighted prediction image encoding method 200 may be performed by, for example but not limited to, the image encoding device 100 in FIG. 1.

In operation S210, a first feature value of a first frame, a second feature value of a second frame and a third feature value of a third frame are calculated, wherein the first frame, the second frame and the third frame are multiple frames in chronological order. For example, as described above, the preprocessing circuit 110 can down-sample a corresponding frame in the frames F1 to F3 to obtain a down-sampled frame, determine luminance information of the corresponding frame according to luminance values of at least a part of pixels of the down-sampled frame, and generate a corresponding feature value in the feature value VF1 of the frame F1, the feature value VF2 of the frame F2 and the feature value VF3 of the frame F3 according to the luminance information of the corresponding frame.

In operation S220, a first offset value is calculated according to the first feature value and the second feature value, and a second offset value is calculated according to the second feature value and the third feature value. For example, as described above, the weighted prediction circuit 120 can determine the offset OS1 according to the difference between the feature value VF1 and the feature value VF2, and determine the offset value OS2 according to the difference between the feature value VF2 and the feature value VF3.

In operation S230, it is determined whether both of the first offset value and the second offset value are greater than or less than a predetermined value. If both of the first offset value and the second offset value are greater than or less than a predetermined value, operation S240 is performed. Alternatively, if not both of the first offset value and the second offset value are greater than or less than the predetermined value, operation S250 is performed. In operation S240, encoding the third frame with utilizing the weighted prediction operation. In operation S250, encoding the third frame without utilizing the weighted prediction operation.

For example, when both of the offset value OS1 and the offset value OS2 are greater than or less than the predetermined value, it means that the luminance of the image content corresponding to the recent frames gradually increases or gradually decreases. In this case, the weighted prediction circuit 120 can determine to output the control signal VC to control the encoding circuit 130 to utilize the weighted prediction operation to encode a current frame (for example, the frame F3). Alternatively, when not both of the offset value OS1 and the offset value OS2 are greater than or less than the predetermined value, it means that the luminance of the image content corresponding to the recent frames does not change or does not change obviously. In this case, the weighted prediction circuit 120 does not control the encoding circuit 130 to utilize the weighted prediction operation to encode the current frame, such that the encoding circuit 130 can use an original image encoding operation to encode a current frame (for example, the frame F3).

The plurality operations of the weighted prediction image encoding method 200 above are merely examples, and are not limited to being performed in the order specified in this example. Without departing from the operation means and ranges of the various embodiments of the present application, additions, replacements, substitutions or omissions may be made to the operations of the weighted prediction image encoding method 200, or the operations may be performed in different orders (for example, simultaneously performed or partially simultaneously performed).

In some related art, a decision of determining whether to perform the weighted prediction operation on an image includes the following operations: (1) traversing (that is, acquiring data values of all pixels in the frame pixel by pixel, for example, including a luminance value (Y value), a chrominance value (U value) and a chroma value (V value)) a frame to be encoded, so as to sequentially calculate an average value and a relative difference respectively corresponding to the luminance value, the chrominance value and the chroma value; (2) calculating a weight and an offset value according to the average value and the relative difference respectively corresponding to the luminance value, the chrominance value and the chroma value; (3) traversing according to the image to be encoded and a reference frame to calculate multiple sums of absolute errors pixel by pixel, and summing the multiple sums of absolute errors to a first sum; (4) again traversing the image to be encoded and the reference frame, calculating multiple sums of absolute errors pixel by pixel, correcting the sums of absolute errors by using the weight and the offset value, and summing the corrected sums of absolute errors to a second sum; and (5) determining according to the first sum and the second sum whether to utilize the weighted prediction operation to encode the frame to be encoded. In the technique above, all pixels in the frame need to be traversed for multiple times, and the luminance value, the chrominance value and the chroma value all need to be calculated, such that the computation amount becomes quite high. Moreover, in operations (1), (3) and (4) above, data coupling (that is, some calculations need to use calculation results generated in previous calculations; for example, operation (4) needs to use the weight and the offset value in operation (2)). As such, the approach of the related technique cannot be readily implemented in a pipelined hardware environment.

Compared to the technique above, in some embodiments of the present application, only the luminance value is calculated, and the frame is down-sampled (that is, only the luminance of some pixels are used) and calculated by a simple method, thereby significantly reducing the computation amount and eliminating data coupling. Thus, without compromising the accuracy of determining whether to utilize the weighted prediction operation, the weighted prediction image encoding method 200 implemented by pipeline hardware can be realized.

Figure 3:
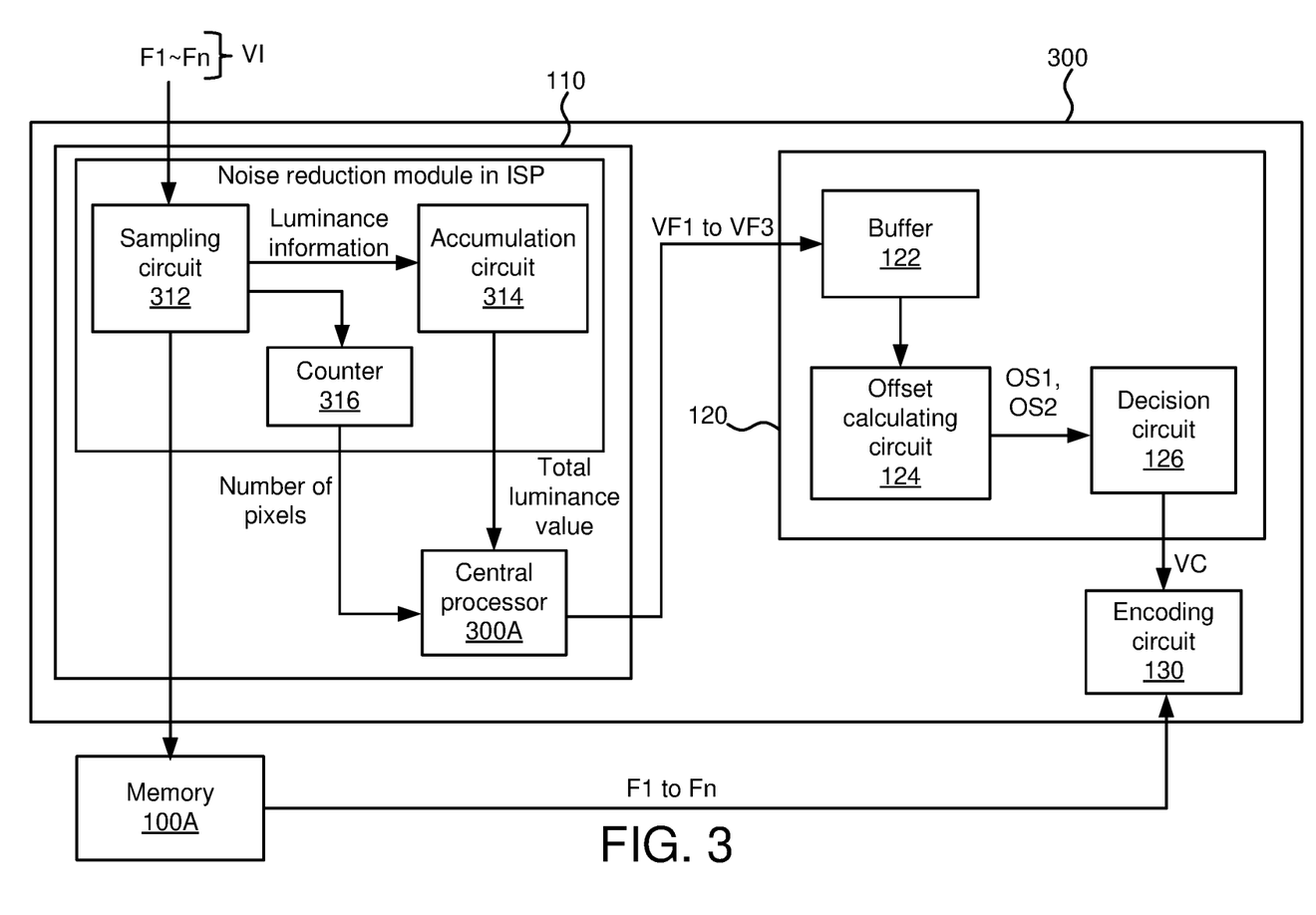
FIG. 3 is a schematic diagram of an image encoding device according to some embodiments of the present application.

FIG. 3 shows a schematic diagram of an image encoding device 300 according to some embodiments of the present application. In some embodiments, the preprocessing circuit 110 in FIG. 1 can be implemented by an existing circuit in the system. For example, the preprocessing circuit 110 can be implemented together by part of circuits in an image signal processor (ISP) in the system and a central processor 300A in the system. For example, different from the image encoding device 100 in FIG. 1, in this example, the multiple feature values VF1 to VF3 are executed by the central processor 300A in the system, and some functions in the preprocessing circuit 110 can be implemented by part of the circuits in the ISP.

More specifically, in FIG. 3, the preprocessing circuit 110 includes a sampling circuit 312, an accumulation circuit 314 and a counter 316; these three circuits can be a noise reduction module (that is, the part of circuits above) in the ISP. The down-sampling circuit 312 can down-sample the multiple frames F1 to Fn to obtain down-sampled frames of the multiple frames F1 to Fn, and read luminance values of at least a part of pixels in each down-sampled frame. The operation of the sampling circuit 312 is similar to that of the down-sampling circuit 112, and is omitted herein. On the other hand, in the noise reduction function, the sampling circuit 312 can also traverse or down-sample the multiple frames F1 to Fn so as to obtain noise related information. In other words, in some embodiments, the operation of the down-sampling circuit 112 in FIG. 1 can be integrated to a sampling circuit used in a current noise reduction module in the system.

The accumulation circuit 314 accumulates the luminance values of at least a part of pixels in a down-sampled image to generate a total luminance value (equivalent to the luminance information of the down-sampled image) of the down-sampled frame. The counter 316 can perform counting when the sampling circuit 312 down-samples the multiple frames F1 to Fn so as to count the number of pixels in a down-sampled frame corresponding each frame. The central processor 300A can obtain related information including the total luminance value and the number of pixels, and generate the feature values VF1, VF2 and VF3 by using the information. For example, the accumulation circuit 314 can calculate the total luminance value of the down-sampled frame corresponding to the frame F1, and a count value of the counter 316 can indicate the number of pixels in the down-sampled frame corresponding to the frame F1. Thus, the central processor 300A can determine the feature value VF1 by using the information above (for example, by using the average calculation above). The central processor 300A can send the multiple feature values VF1, VF2 and VF3 to the weighted prediction circuit 120 for subsequent operations. For example, the central processor 300A can directly store the multiple feature values VF1, VF2 and VF3 to the buffer 122, or provide the multiple feature values VF1, VF2 and VF3 to the offset calculating circuit 124, and the feature values VF1, VF2 and VF3 are stored to the buffer circuit 122 via the offset calculating circuit 124.

Figure 4:
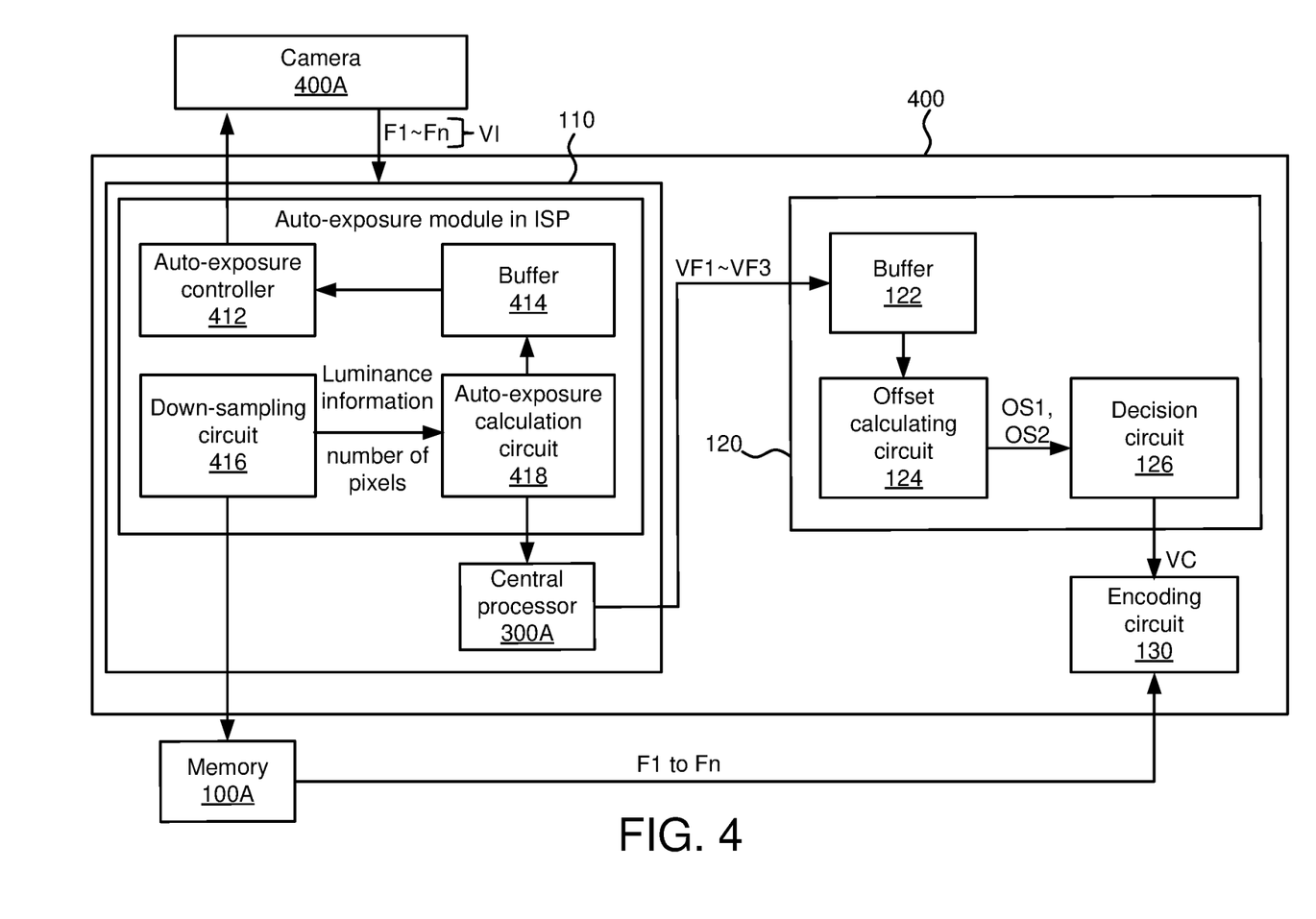
FIG. 4 is a schematic diagram of an image encoding device according to some embodiments of the present application.

FIG. 4 shows a schematic diagram of an image encoding device 400 according to some embodiments of the present application. In some embodiments, the preprocessing circuit 110 in FIG. 1 can be implemented by an existing circuit in the system, and the preprocessing circuit 110 can be implemented together by a circuit in an ISP in the system and the central processor 300A in the system. Similar to FIG. 3, in this example, the multiple feature values VF1 to VF3 are calculated by the central processor 300A in the system. As shown in FIG. 4, the preprocessing circuit 110 includes an auto-exposure controller 412, a buffer 414, a down-sampling circuit 416 and an auto-exposure calculation circuit 418. The auto-exposure controller 412 can control exposure of a camera 400A according to related parameters stored in the buffer 414. In some embodiments, the operation of the down-sampling circuit 112 in FIG. 1 can be integrated to the down-sampling circuit 416 used in a current auto-exposure module in the system. The operation of the down-sampling circuit 416 is similar to that of the down-sampling circuit 112, and is omitted herein. The auto-exposure calculation circuit 418 can perform auto-exposure calculation according to a luminance value captured by the down-sampling circuit 416 to determine related parameters stored in the buffer 414, and transmit information such as the luminance value and the number of pixels to the central processor 300A. Thus, the central processor 300A can generate the multiple feature values VF1, VF2 and VF3 described above.

In some embodiments shown in FIG. 1, FIG. 3 and/FIG. 4, the multiple feature values VF1, VF2 and VF3 fully undergo calculation before entering the weighted prediction circuit 120 and the encoding circuit 130. Thus, an existing circuit in an ISP in the system can be used to implement the preprocessing circuit 110, and part of operations in the preprocessing circuit 110 can be performed by part of circuits in the system. If the multiple feature values VF1, VF2 and VF3 are alternatively generated by an encoder (for example, the encoding circuit 130) in the system, the encoder needs to sequentially read the multiple frames F1 to Fn to perform operations including down-sampling and generating feature values and offset values (as shown in FIG. 2), and read a frame to be encoded from the memory 100A for encoding. Thus, the operation timings needed by the encoder may become overly long and does not meet actual application requirements. In contrast, since an ISP is usually an upper-layer circuit (or a circuit of a previous stage) of an encoder, the operation timings the ISP for processing the multiple frames F1 to Fn can be regarded as operation timings independent from the operation timings of the encoder for processing the multiple frames F1 to Fn. As such, down-sampling can be performed and luminance information can be obtained in advance by the ISP to allow the encoder to have more time for image encoding, thereby facilitating hardware implementation and meeting timing requirements in actual applications.

In conclusion, the image encoding device and the weighted prediction image encoding method in some embodiments of the present application can determine, by utilizing a simple calculation, whether to use weighted prediction operation to encode frames. Thus, the data computation amount needed and data coupling (or dependency) can be significantly reduced, thereby facilitating hardware implementation and accelerating the overall encoding speed. On the other hand, in actual application, the simple operation above can be shared with part of circuits in the system, so that related calculations for weighted prediction image encoding can be integrated to the current system.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A weighted prediction image encoding method, comprising:
   calculating a first feature value of a first frame, a second feature value of a second frame and a third feature value of a third frame;
   calculating a first offset value according to the first feature value and the second feature value, and calculating a second offset value according to the second feature value and the third feature value; and
   when both of the first offset value and the second offset value are greater than or less than a predetermined value, encoding the third frame by utilizing weighted prediction operation,
   wherein the first frame, the second frame and the third frame are a plurality of frames in chronological order.

2. The weighted prediction image encoding method according to claim 1,
   wherein the calculating of the first feature value of the first frame, the second feature value of the second frame and the third feature value of the third frame comprises:
   generating a down-sampled frame according to a corresponding frame in the first frame, the second frame and the third frame; and
   determining a corresponding feature value in the first feature value, the second feature value and the third feature value according to luminance information of the down-sampled frame.

3. The weighted prediction image encoding method according to claim 2,
   wherein the determining of the corresponding feature value in the first feature value, the second feature value and the third feature value according to the luminance information of the down-sampled frame comprises:
   determining the luminance information of the down-sampled frame according to luminance values of at least a part of pixels in the down-sampled frame; and
   performing a statistical calculation according to the luminance information of the down-sampled frame to generate the corresponding feature value.

4. The weighted prediction image encoding method according to claim 1,
   wherein the calculating of the first offset value according to the first feature value and the second feature value, and calculating of the second offset value according to the second feature value and the third feature value comprise:
   calculating a difference between the first feature value and the second feature value to determine the first offset value; and
   calculating a difference between the second feature value and the third feature value to determine the second offset value.

5. The weighted prediction image encoding method according to claim 1,
   further comprising:
   when not both of the first offset value and the second offset value are greater than or less than the predetermined value, encoding the third frame without utilizing the weighted prediction operation.

6. An image encoding device, comprising:
   a preprocessing circuit, calculating a first feature value of a first frame, a second feature value of a second frame and a third feature value of a third frame; and
   a weighted prediction circuit, calculating a first offset value according to the first feature value and the second feature value, calculating a second offset value according to the second feature value and the third feature value, and when both of the first offset value and the second offset value are greater than or less than a predetermined value, controlling an encoding circuit to utilize weighted prediction operation to encode the third frame,
   wherein the first frame, the second frame and the third frame are a plurality of frames in chronological order.

7. The image encoding device according to claim 6, wherein the preprocessing circuit generates a down-sampled frame according to a corresponding frame in the first frame, the second frame and the third frame, and determines a corresponding feature value in the first feature value, the second feature value and the third feature value according to luminance information of the down-sampled frame.

8. The image encoding device according to claim 7, wherein the preprocessing circuit comprises:
   a down-sampling circuit, down-sampling the corresponding frame to obtain the down-sampled frame; and
   a feature calculating circuit, determining luminance information of the down-sampled frame according to luminance values of the at least a part of pixels in the down-sampled frame, and performing a statistical calculation according to the luminance information of the down-sampled frame to determine the corresponding feature value.

9. The image encoding device according to claim 8, wherein the feature calculating circuit calculates an average luminance value of all pixels in the down-sampled frame to determine the corresponding feature value.

10. The image encoding device according to claim 6, wherein the preprocessing circuit comprises:
    a part of circuits in an image signal processor (ISP), down-sampling a corresponding frame in the first frame, the second frame and the third frame to generate a down-sampled frame; and
    a central processor, determining a corresponding feature value in the first feature value, the second feature value and the third feature value according to luminance information of the down-sampled frame.

11. The image encoding device according to claim 10, wherein the part of circuits is an auto-exposure module or a noise reduction module.

12. The image encoding device according to claim 6, wherein the weighted prediction operation circuit comprises:
- an offset calculating circuit, calculating a difference between the first feature value and the second feature value to determine the first offset value, and calculating a difference between the second feature value and the third feature value to determine the second offset value; and
- a decision circuit, when both of the first offset value and the second offset value are greater than or less than the predetermined value, controlling the encoding circuit to encode the third frame by utilizing the weighted prediction operation.

13. The image encoding device according to claim 6, wherein when not both of the first offset value and the second offset value are greater than or less than the predetermined value, the weighted prediction circuit does control the weighted prediction circuit to encode the third frame without utilizing the weighted prediction operation.

* * * * *